United States Patent [19]

Nilsson et al.

[11] Patent Number: 5,444,843
[45] Date of Patent: Aug. 22, 1995

[54] METHOD FOR PRODUCING DATABASE COORDINATED DRAWINGS FOR A FACILITY

[75] Inventors: Paul E. Nilsson, Long Beach, Calif.; Frances A. Laughlin, Portland, Me.; Roy Wyma, Pasadena, Calif.

[73] Assignee: Atlantic Richfield Company, Los Angeles, Calif.

[21] Appl. No.: 135,835

[22] Filed: Oct. 13, 1993

[51] Int. Cl.[6] .............................................. G06T 11/20
[52] U.S. Cl. ..................................... 395/161; 395/155
[58] Field of Search ............... 395/170, 161, 155, 140, 395/141

[56] References Cited

U.S. PATENT DOCUMENTS

| | | | |
|---|---|---|---|
| 5,019,961 | 5/1991 | Addesso et al. | 395/161 X |
| 5,128,870 | 7/1992 | Erdman et al. | 395/161 X |
| 5,138,697 | 8/1992 | Yamamoto et al. | 395/120 |
| 5,257,203 | 10/1993 | Riley et al. | 395/161 X |
| 5,265,197 | 11/1993 | Kondo | 395/161 X |
| 5,289,568 | 2/1994 | Hosoya et al. | 395/155 X |
| 5,293,478 | 3/1994 | Yamamoto et al. | 395/161 |

OTHER PUBLICATIONS

"Creating Intelligent P&IDs" by D. Catena, et al, *Hydrocarbon Processing*, Nov. 1992, pp. 65–68.

Primary Examiner—Heather R. Herndon
Assistant Examiner—Cliff Nguyen Vo

[57] ABSTRACT

A method for generating and maintaining drawings for an industrial facility by a) entering drawing information into a computer-aided drawing work station to produce a drawing in a format adapted for conversion to a form suitable for comparison with a master database and rule set; b) converting the drawing information into a form suitable for comparison with the master database; c) comparing the converted drawing information to the master database and rule set; d) generating a discrepancy report of any discrepancies between the drawing and the master database and rule set; e) resolving any such discrepancies; f) entering the converted drawing information into the master database; g) editing the master database; h) transferring an edited copy of the master database to the graphics system; i) importing the edited copy of the master database into the graphics section and updating symbology as appropriate; and, j) generating a human readable copy of the drawing. The method system may also be used to revise drawings.

10 Claims, 2 Drawing Sheets 5,444,843

METHOD FOR PRODUCING DATABASE COORDINATED DRAWINGS FOR A FACILITY

BACKGROUND OF THE INVENTION

1. Field of the Invention

This invention relates to a method for producing drawings and associated data for a facility by integration of a drawing generation and revision system and a database system to insure that drawings and data are produced, revised and maintained in accordance with facility requirements.

2. Background of the Invention

Schematic drawings of process units showing equipment, instrumentation, piping, valves and other components and associated data are required for construction, operation and maintenance of industrial facilities such as petroleum refineries, chemical plants, manufacturing plants and the like. These schematic drawings are initially prepared and used for the construction of the units and are frequently referred to as process and instrument diagrams (P&ID's). These P&ID's are also used for operation and maintenance of the unit after construction and are retained and used for many years.

It is difficult to keep these P&ID's current and consistent with current facility requirements for the components shown on the P&ID's. Subsequent revisions to the process or components of the processes or equipment shown on the P&ID's which may be made by engineers, maintenance personnel, construction personnel or others in connection with facility revamps, upgrades, maintenance or the like may change facility requirements or component requirements for the components shown in the P&ID's. These revisions are not always entered on the P&ID's. The P&ID's thus become outdated and less reliable.

This is a matter of great concern to operators of industrial facilities since P&ID's are frequently used for training, trouble shooting and other purposes related to operating and maintaining facilities. Further, OSHA has recently issued requirements, particularly OSHA 29 CFR 1910.119 which requires all U.S. plants to conduct process hazards analyses to reduce catastrophic accidents. These process hazard analyses require current P&ID's.

As a result, most industrial facilities in the United States are faced with the problem of creating and maintaining current P&ID's. This problem has been addressed in an article entitled "Create Intelligent P&ID's" published November 1992 in Hydrocarbon Processing, pages 65–68 by D. Catena, J. T. Dietz and T. D. Traubert. This article discusses the need for Intelligent P&IDs and recognizes the problems inherent in updating and maintaining P&IDs. The article appears to be directed to the production of P&ID's, which can include additional data and which can be "rippled out" to other drawings which contain effected equipment and the like. The article does not appear to address the continuing concern of maintaining the P&ID's consistent and in compliance with overall facility standards or the requirements for particular lines or components of equipment which may be affected by changes in other pieces of equipment.

As a result a continuing effort has been directed to the development of a method whereby drawings can be generated and maintained in accordance with a rule set to ensure that the drawings meet the facility design, operation and maintenance requirements; insure changes can be identified and easily managed and that drafting and engineering input can be done simultaneously by independent parties.

SUMMARY OF THE INVENTION

It has now been found that such drawings can be effectively created by generating drawings for at least a portion of an industrial facility and coordinating the drawings with a master database and rule set of selected requirements for the facility so that the drawings meet the master database and rule set requirements. The method comprises: a) entering drawing information into a graphics system to produce a drawing in a format adapted for conversion to a form suitable for comparison with the master database and rule set, the drawing including symbols identifying at least a portion of components shown on the drawing, and user identification numbers assigned to at least a portion of the components, the drawing information further including a unique identification number for each component and class of use information related to component function, component operating conditions and component requirements; b) converting the drawing information into information of a form suitable for comparison with the master database and rule set; c) comparing the converted drawing information to the master database and rule set; d) generating a discrepancy report of any discrepancies between the converted drawing information and the master database and rule set; e) resolving any such discrepancies; f) entering the converted drawing information into the master database; g) editing the master database; h) transferring an edited copy of the master database to the graphics system; i) importing the edited copy of the master database into the graphics section and updating symbology as appropriate; and, g) generating a human readable copy of the drawing information.

The method may also be used to revise and maintain drawings in a similar fashion.

DESCRIPTION OF PREFERRED EMBODIMENTS

In the discussion of the Figures the same names and numbers will be used throughout to refer to the same or similar components.

Figure 1:
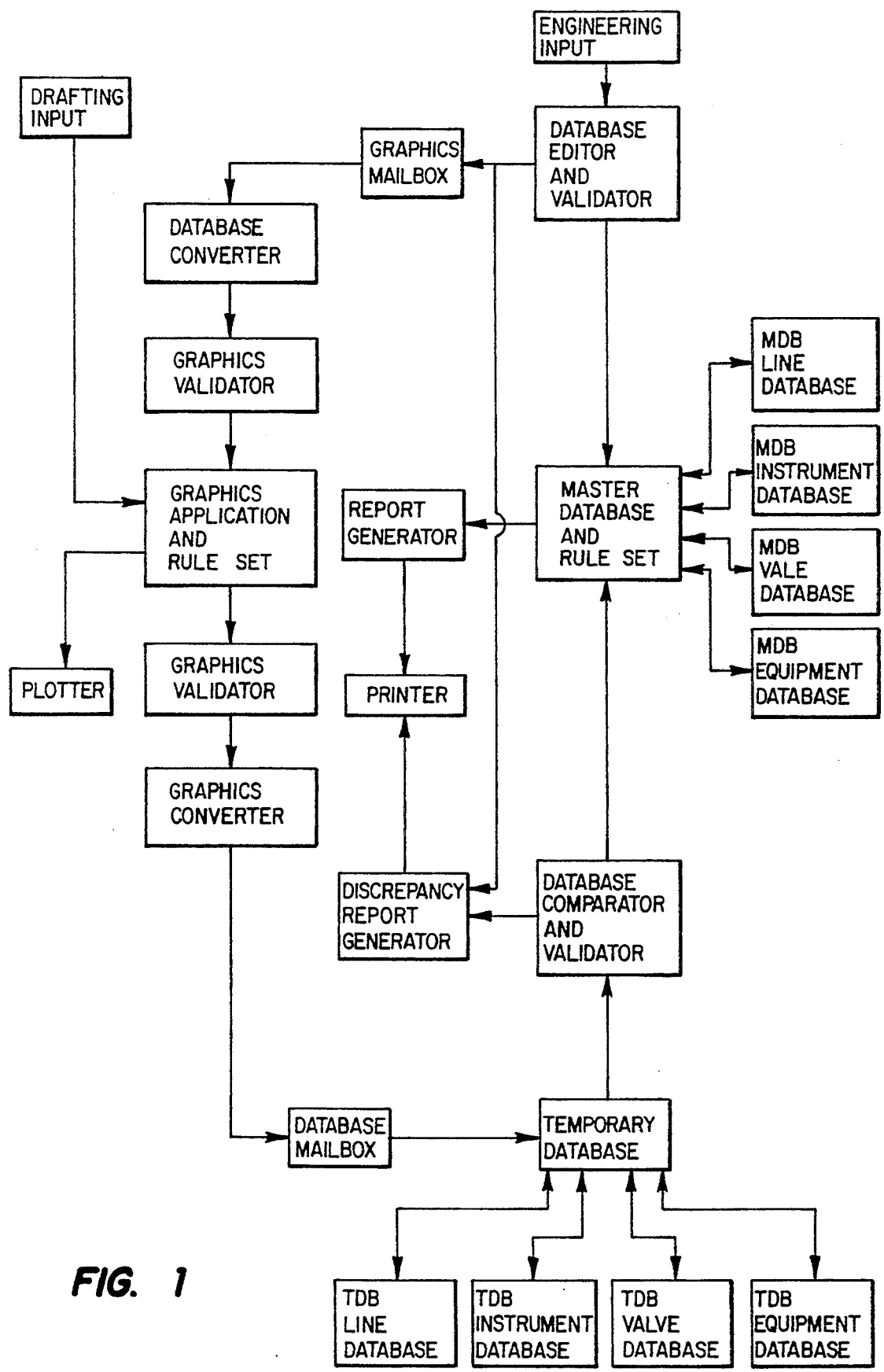
FIG. 1 is a functional block diagram of an embodiment of the method of the present invention.

In FIG. 1, a functional block diagram of an embodiment of the method of the present invention is shown.

A Graphics Application and Rule Set (Graphics) is shown for receiving drawing information from a Drafting Input to produce a drawing. Graphics requires the input of an accepted symbol for each component. The accepted symbols may be produced from a memory bank in Graphics or be otherwise available to Graphics. The Drafting Input functions and the Graphics functions are readily accomplished by use of a computer-aided-drawing (CAD) work station as known to the art. The accepted symbols represent particular types of process components on the drawing. Each component shown on the drawing is identified by its appropriate symbol and its unique identification number. Certain of the components will also be identified by user identification numbers. Desirably, a unique identification number is assigned to each drawing component as the component is added to the drawing. User identification numbers can also be assigned to certain of the components, including lines, instruments, equipment and valves. Graphics includes or is able to access an associated database, which provides a suitable structure for input of all required information for the drawing. While the drawing, including the information required by the associated database is being completed, it is validated against a Graphics rule set by comparing the drawing data being entered to user defined parameters for acceptable format and value of the data in a Graphics Validator. The Graphics Validator basically checks to insure that the component identification is correct and that selected other information has been supplied in accordance with the Graphics rule set. Such comparisons help ensure that all drawings are in compliance with existing facility requirements and component requirements.

When all Graphics Validation requirements have been met, the drawing and associated drawing information is passed to a Graphics Converter. The Graphics Converter converts the drawing and associated drawing information into a computer language suitable for translation to a database. The converted drawing and drawing information are then passed to a Database Mailbox where the information may be retained until it is desired to import it into a Temporary Database.

The Temporary Database is structured to classify the drawing components, including their associated drawing information into four classifications: lines, instruments, valves and equipment. Equipment is a general term which refers to all components which are not lines, instruments or valves. The Temporary Database (TDB) includes a TDB Line Database, a TDB Instrument Database, a TDB Valve Database and a TDB Equipment Database. These TDB databases function to format the drawing and associated drawing information into a form compatible with a Master Database and Rule Set (MDB) for a facility. When the drawing and associated information have been placed in a suitable format in the Temporary Database, a Database Comparator and Validator performs a comparison with the MDB.

The MDB includes drawing and drawing information for a facility, a record of identification numbers for components on drawings for the facility, standard requirements and engineering practice requirements and the like, specific requirements for particular lines, instruments, valves and equipment, and other information that may be required by a particular user for use in preparing drawings for a facility (facility requirements). The MDB also classifies such information into a line, an instrument, a valve and an equipment database i.e, an MDB Line Database, an MDB Instrument Database, an MDB Valve Database and an MDB Equipment Database. The MDB is accessible to generate reports of information, tables, drawings and the like as required by the users.

The MDB may be revised by engineering input. Engineering information is entered via engineering input into a Database Editor and Validator which validates the data entry from Engineering Input against the MDB. Changes are forwarded to Graphics where they are integrated with changes made to the drawing information and all changes are validated against the Graphics rule set. Such comparisons help insure that all drawings are in compliance with existing facility requirements and component requirements. The Database Editor and Validator may also be used to generate and pass information to Graphics to generate new drawings or for use in revising drawings. Information passed from the MDB to Graphics passes through a Database Converter to convert the transferred information to a format suitable for use in Graphics.

Because changes to the drawing and drawing information may be occurring simultaneously via drafting input to Graphics and engineering input to the MDB it is important that these changes be brought together and any discrepancies resolved prior to issuing a drawing from Graphics via a Plotter or a report from the MDB via a Report Generator or Printer. This is accomplished using a Graphics Mailbox and the Database Mailbox. If data exists in the Graphics Mailbox, data cannot be exported from Graphics until the Graphics mailbox data has been converted and validated against the Graphics rule set. Similarly, if data exists in the Database Mailbox, data cannot be exported from the Database Editor and Validator until the Database Mailbox data has been compared and validated against the MDB.

A discrepancy report is generated by a Discrepancy Report Generator showing any differences between the drawing (and drawing information) and the MDB. The discrepancy report may simply be reviewed and acknowledged as a correct statement of the changes made which may be considered to be correct. Alternatively, the discrepancy report may indicate that undesired discrepancies exist between the drawing and the MDB. These discrepancies may be resolved by engineering changes to the MDB, by drafting revisions to the drawing or the like. When the drawing is considered to be correct it is passed to the Database Comparator and Validator for download validation. Download validation normally includes correlation of the user identification and unique identification numbers with the MDB to ensure that the numbers are unique and have not been duplicated.

By thus checking all drafting and engineering inputs against the MDB and Graphics rule sets, the drawings in the MDB can be produced and maintained in compliance with all facility requirements.

When a drawing is revised, a copy of the drawing is obtained from the MDB and passed to Graphics for revision. The revisions are then made and the revised drawing is subjected to the same procedure as a new drawing to insure that the revisions are in compliance with existing requirements. When the revised drawing is in compliance with all existing requirements, it is placed in the MDB and is available for use for construction, operation, maintenance, etc. of the facility.

The present system insures that drawings, when produced, correctly include all required information by requiring completion of the information required in the format received from the Temporary Database by Graphics when the drawing is initiated and that the information entered is consistent with all conditions applicable to the drawings for the facility and with requirements of the facility for all operating lines, instruments, valves and equipment shown on the drawing. By the present invention drawings can be insured to be of high quality, accurate and consistent with previous drawings for the same or similar equipment and in compliance with overall requirements for the facility including general engineering standards and the like.

When the drawing (data) is in the MDB, it may be accessible to multiple users and may be used to supply information to Graphics to produce drawings, or to the printer to produce reports.

It should be understood that a single personal computer may be used to carry out the claimed method.

A variety of computer-aided-drawing (CAD) software programs are available commercially to produce the drawings in Graphics as well as the other functions described above and no novelty is considered to reside in the particular software programs or computers, printers, input stations and the like selected for the production and revision of the drawings.

Certain of these software programs and the allotted equipment selected may not be directly compatible but software programs for linking the software programs and equipment are commercially available. The CAD systems and database systems are generally not compatible without slight modification, but it is well within the skill of those in the art to modify the selected systems to be interactive as desired. It is considered that generic software is commercially available to effectively accomplish all of the functions required in the present invention.

EXAMPLE

Figure 2:
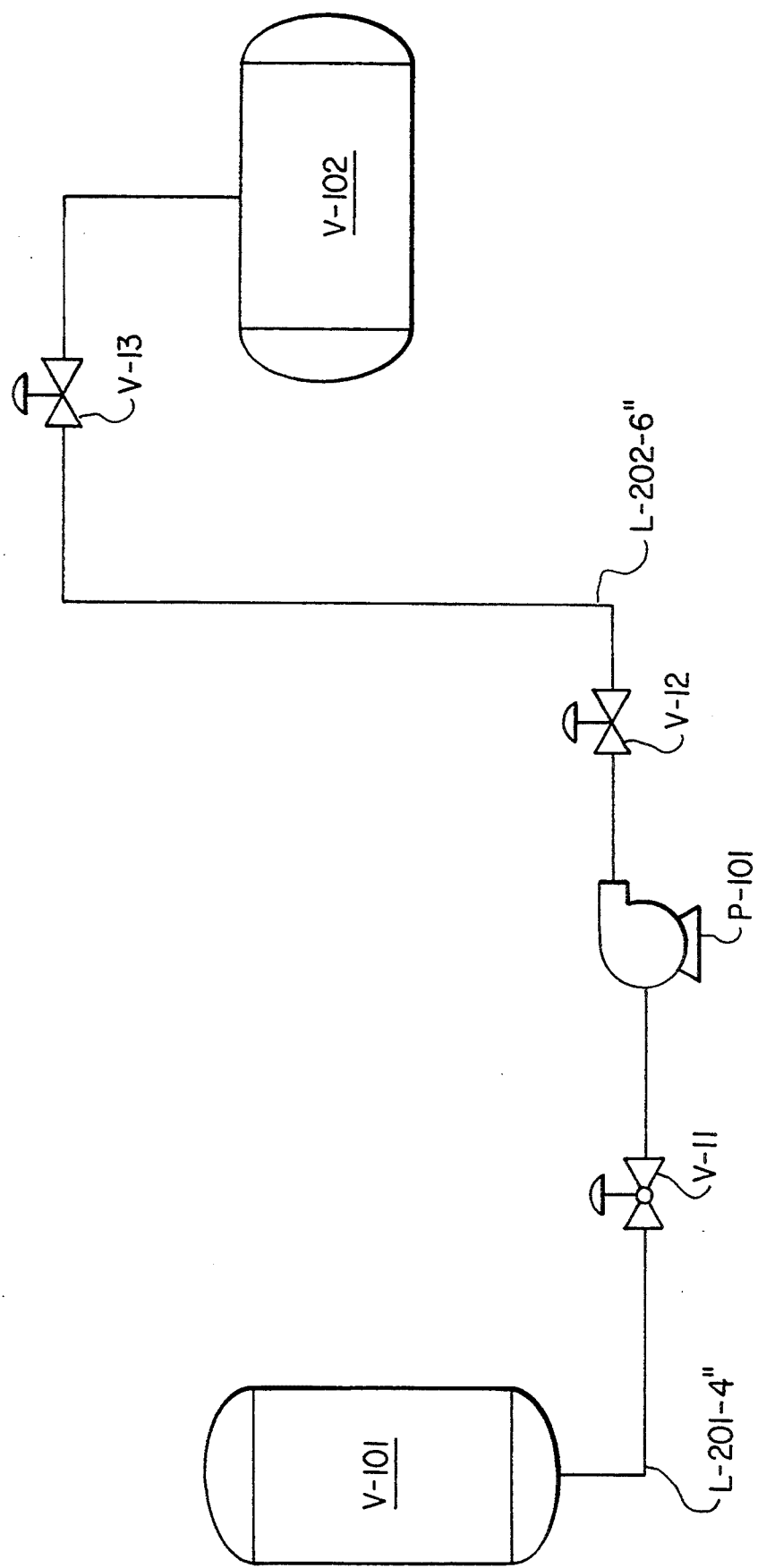
FIG. 2 is a simplified schematic diagram of a portion of a P&ID.

In FIG. 2 a simple drawing of a vessel (V101) connected by a line (L-201-4") including a valve (V-11) to a pump (P101) which is connected by a line (L-202-6") including a valve (V-12) and a valve (V-13) to a vessel (V102) is shown. Upon preparation of this drawing according to the present system, symbols will be selected, as shown, to represent vessels, pumps, valves, lines and the like. The symbols selected are taken from a symbol library developed by the user which resides in the Graphics memory. Graphics then obtains a format from the Temporary Database identifying the information required by the MDB for each of the components shown on the drawing. This information may relate to size, configuration, materials of construction, temperature, pressure, contents, pressure relief conditions, and a variety of other conditions known to those skilled in the art and selected by the user. The drawing is created as the user places symbols on the drawing and is prompted by Graphics to provide some minimum amount of information such as user identification number, component name, size and the like. When the first effort at defining the drawing is complete, the drawing is validated against the Graphics rule set, converted to a database format, compared to the MDB rule set and, if in accordance, downloaded to the MDB. Reports can be generated from the MDB which show what information is missing to completely define the various drawing components in sufficient detail to meet facility requirements. As this information is developed by various personnel it is input via the Database Editor and Validator. As the information is entered it is validated against the Master Database rule set to ensure the data being entered is in accordance with facility requirements. Since some of the information being entered may impact how the drawing should be graphically represented the changes are passed back to Graphics so that symbology can be updated to reflect the changes. For instance, according to the present invention, "valve type" is part of the information required by the facility. In FIG. 2 a valve V-11 is shown as a "ball" valve. Thus, when this symbol was placed on the drawing, "ball" is stored as part of the information associated with the symbol for valve V-11. After the drawing has been downloaded into the MDB, if a user changed valve V-11's valve type from "ball" to "gate" using the Database Editor, when the MDB changes were sent to Graphics, the symbol for valve V-11 would be changed to look like the symbol for valve V-13 which is shown on FIG. 2 as a gate valve. Similarly, Graphics changes may impact the validity of data stored in the MDB. Suppose the MDB were defined to say that gate valves cannot be used in lines larger than 6". If, through drafting input, someone changed Line L-202-6" from a 6"line (as currently shown in FIG. 2) to an 8" line, valve V-13 (a gate valve) no longer meets the facility requirements and would be shown on the discrepancy report when the Graphics changes were sent to the MDB. A decision must then be made to either redefine the Rule Set or change the valve type.

The use of this invention insures that P&IDs for a facility can be maintained current, accurate and readily available. Since the information can be drawn directly from the master database to user stations, and the information supplied to and maintained on the master database can be insured to meet all criteria required for current drawings and all facility requirements, the facility master database of information can be maintained current. It greatly facilitates the use of the master database when users can be assured that existing, new and revised drawings are current and in compliance with all master database requirements.

Having thus described the invention by reference to its preferred embodiments, it is pointed out that the embodiments disclosed are illustrative rather than limiting in nature and that many variations and modifications are possible within the scope of the present invention. Many such variations and modifications may be considered obvious and desirable by those skilled in the art based upon the foregoing example and the description of preferred embodiments.

Having thus described the invention, we claim:

1. A method for generating drawings for at least a portion of an industrial facility and coordinating said drawings with a master database and rule set of selected requirements for said industrial facility so that said drawings meet said selected requirements, said method comprising:
    a) entering drawing information into a graphics system to produce a drawing in a format adapted for conversion to a form suitable for comparison with said master database and rule set, said drawing including symbols identifying at least a portion of components shown on said drawing and user identification numbers assigned to at least a portion of said components, said drawing information further including a unique identification number for each component and class of use information related to component function, component operating conditions and component requirement;
    b) converting said drawing information into converted drawing information of a form suitable for comparison with said master database and rule set;
    c) comparing said converted drawing information to said master database and rule set;
    d) generating a discrepancy report of any discrepancies between said drawing and said master database and rule set;
    e) resolving any such discrepancies;
    f) entering said drawing information into said master database; and, g) editing said master database;

h) transferring an edited copy of said master database to said graphics system;

i) importing said edited copy of said master database into said graphics system and updating symbology as appropriate; and, j) generating a human readable copy of said drawing information.

2. The method of claim 1 wherein said master database is updated and revised by entering new, update or revision information into said master database via a database editor and validator to insure that all conditions for entry into said master database are met.

3. The method of claim 1 wherein said master database comprises a master database line database, a master database instrument database, a master database valve database and a master database equipment database.

4. The method of claim 1 wherein said drawing information is converted to a form suitable for comparison with said master database in a temporary database.

5. The method of claim 4 wherein said temporary database includes a temporary database line database, a temporary database instrument database, a temporary database valve database, and a temporary database equipment database.

6. A method for revising drawings for at least a portion of an industrial facility and coordinating said drawings with a master database and rule set of selected requirements for said industrial facility so that said drawings meet said selected requirements, said method comprising:

a) entering drawing information into a graphics system to produce a revised drawing from a drawing included in said master database, said revised drawing being in a format suitable for comparison with said master database and rule set, and including symbols identifying at least a portion of components shown on said drawing and user identification numbers assigned to at least a portion of said components, said drawing information further including a unique identification number for each component and class of use information related to component function, component operating conditions and component requirements;

b) converting said drawing information into converted drawing information of a form suitable for comparison with said master database and rule set;

c) comparing said converted drawing information to said master database and rule set;

d) generating a discrepancy report of any discrepancies between said drawing and said master database and rule set;

e) resolving any such discrepancies;

f) entering said drawing information into said master database; and, g) editing said master database;

h) transferring an edited copy of said master database to said graphics system;

i) importing said edited copy of said master database into said graphics system and updating symbology as appropriate; and, j) generating a human readable copy of said drawing information.

7. The method of claim 6 wherein said master database is updated and revised by entering new, update or revision information into said master database via a database editor and validator to insure that all conditions for entry into said master database are met.

8. The method of claim 6 wherein said master database comprises a master database line database, a master database instrument database, a master database valve database and a master database equipment database.

9. The method of claim 6 wherein said drawing information is converted to a form suitable for comparison with said master database in a temporary database.

10. The method of claim 9 wherein said temporary database includes a temporary database line database, a temporary database instrument database, a temporary database valve database, and a temporary database equipment database.

* * * * *